March 19, 1968 R. A. CHAPMAN 3,373,603
TORQUEMETER WITH POSITIVE AND NEGATIVE READING
Filed March 28, 1966 2 Sheets-Sheet 1

INVENTOR
Roy Alan CHAPMAN

ATTORNEY

March 19, 1968 R. A. CHAPMAN 3,373,603
TORQUEMETER WITH POSITIVE AND NEGATIVE READING
Filed March 28, 1966 2 Sheets-Sheet 2

INVENTOR
Roy Alan CHAPMAN

ATTORNEY

United States Patent Office 3,373,603
Patented Mar. 19, 1968

3,373,603
TORQUEMETER WITH POSITIVE AND NEGATIVE READING
Roy A. Chapman, Greenfield Park, Quebec, Canada, assignor to United Aircraft of Canada Limited, Longueuil, Quebec, Canada
Filed Mar. 28, 1966, Ser. No. 537,851
11 Claims. (Cl. 73—136)

ABSTRACT OF THE DISCLOSURE

A torquemeter for measuring positive and negative torque transmitted by a shaft through helical gearing. The shaft is movable axially in either direction depending on the magnitude of torque transmitted. A hydraulic spool valve arrangement located axially at the end of the shaft provides counter pressure against the axial movement of the shaft due to the torque transmitted, the amount of counter pressure applied providing an indication of the torque transmitted by the shaft. The counter pressure is provided when movement of the spool valve passes hydraulic fluid to one of two pistons connected to the shaft to balance the movement of the shaft.

---

Figure 1:
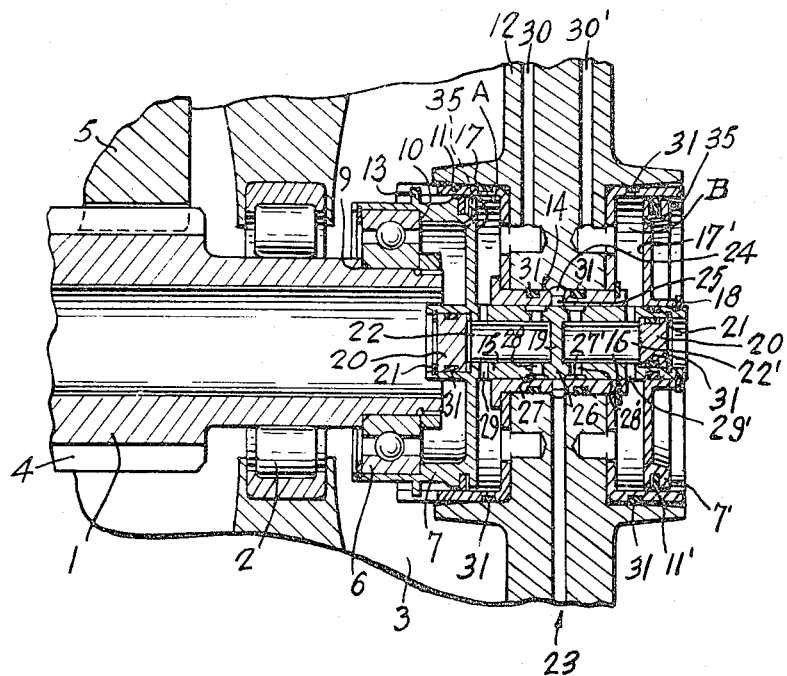

The present invention relates to devices for measuring or otherwise registering torque. More particularly, the invention relates to a torquemeter adapted to allow for both positive and negative torque to be assessed.

The invention finds particular applicability to propeller shafts for ships and aircraft. Such propeller shafts are subject to rapid changes in the direction of torque. At the same time, it is necessary for the magnitude of the torque to be known accurately, not only to avoid undue strain being imposed upon the propeller shaft, but so that the information can be supplied to information dependent instruments or control devices such as governors controlling pitch or power adjustment or gear changing.

Particularly in the case of aircraft propeller shafts, the direction of torque between the shaft itself and the power train of the engine is subject to rapid changes in direction, for example, when the propeller pitch is reversed during landing to cause the propeller to act as a brake. When the propeller pitch is reversed, the direction of torque changes from a direction away from the power train to the propeller shaft, to a direction away from the propeller shaft to the gear train. Another way of describing this situation is to say that the torque on the propeller shaft changes from positive to negative, and it is the main aim of the present invention to provide a simple and compact means for enabling such positive and negative torque to be rapidly and accurately assessed.

The invention includes the cases where the torque is measured on a visual indicator and the cases where the magnitude of the torque is assimilated and utilized by automatic instruments which may not necessarily show a visual indication of the magnitude of the torque. The word "torquemeter" is conventionally employed for devices of the latter type and does not necessarily imply the inclusion in the device itself of measuring instruments.

It is well known that when two gear shafts are coupled by gears, the teeth of which are not parallel to the axes of the shafts, for example, when the shafts are coupled by helical, bevel, or hypoid gears, thrust is developed axially between the two coupled shafts. It is also well known that helical gears may be devised in which the axial thrust developed between the shafts bears a linear relationship to the amount of torque transmitted.

The present invention makes use of this known system for providing axial thrust upon a shaft which is axially displaceable with respect to an axially fixed helical gear. The shaft is coupled to a novel assembly of spool valve and actuator means. Depending upon the direction of axial thrust on the shaft, which in turn depends upon the direction of torque, that is, whether the torque is positive or negative, moves the spool valve to admit pressurized fluid, preferably a hydraulic liquid, to one of two piston surfaces provided in the actuator means. The fluid pressure against the piston increases until it balances the thrust imposed upon the shaft by the transmitted torque. Means are provided for measuring the fluid pressure acting against the piston as a measurement of the thrust. If the direction of torque is reversed, the spool valve moves to bring the other piston surface into operation, which balances the axial thrust in the opposite sense.

Thus, in accordance with one aspect of the invention, there is provided a torquemeter for measuring positive and negative torque comprising:

An axially displaceable shaft having a helical gear adapted to mesh with a second axially fixed helical gear for transmission of axial thrust to the shaft relative to such second gear in proportion to the torque imposed on the shaft and in one or other axial direction depending upon whether the said imposed torque is positive or negative, A spool valve coaxial with said shaft adjacent an end thereof and having an axially central fluid inlet port and a sliding valve member movable axially with said shaft, Actuator means including a pair of piston surfaces arranged to move said shaft axially in one or other of opposite respective directions upon inflow of pressurized fluid into contact with one or the other respective piston surface, Means for measuring the fluid pressure operating in against each piston surface, Said sliding valve member having transfer ports symmetrically disposed about an axially central land and arranged upon displacement from a central closed position of the valve due to the imposition of torque to the shaft to pass pressurized fluid into contact against one or the other piston surface depending upon the direction of torque transmission, to balance the thrust on the shaft.

In more specific terms, there is preferably provided in accordance with the invention a torquemeter for measuring positive and negative torque comprising:

A rigid housing defining a pair of opposed open ended cylinders and a spool valve cylinder disposed between said open ended cylinder and having a central fluid inlet port, Means constituting a fluid outlet port axially spaced on each side of said inlet port and communicating respectively with said cylinders, Valve means slidable in said cylinder and defining a pair of transfer ports separated by a central land, said land being of sufficient axial dimension to block said inlet port in a central position of said piston means indicative of "no thrust,"

One of said transfer ports being adapted to register with said inlet port and with one of said outlet port means upon displacement of the valve means in one axial direction and the other transfer port being adapted to register with said inlet port and with the other of said outlet port means upon displacement of said valve means in the opposite axial direction, A shaft axially aligned with said piston means and displaceable axially, A helical gear on said shaft adapted to mesh with a driven helical gear for axial displacement of said shaft in proportion to torque transmitted through said gears, First piston means in one of said cylinders, second piston means in said other cylinder, said shaft being arranged to displace said first piston and thereby said valve means in said one direction upon corresponding displacement by said gears and to displace said second piston and thereby said valve means in said opposite direction upon corresponding displacement by said gears, Said valve means being arranged to pass pressurized fluid into said first or said second cylinder depending upon the direction of displacement until said torque thrust is balanced by said fluid pressure, and Fluid passages communicating with said cylinders and adapted for connection to means for registering the fluid pressure therein.

In one form of the invention, the open ended cylinders described above are co-axial with the spool valve cylinder, the latter extending centrally between the closed ends of the cylinders. In this form of the invention, the first and second pistons may be formed as annular flanges rigid with the valve means adjacent respective axial extremities thereof.

In another form of the invention, the piston or sliding member of the spool valve is in two parts respectively coupled to the actuator pistons which are co-axial with the spool valve, the pistons being maintained apart by spring means. The spring means is provided around an axial projection at the end of the displaceable shaft, the projection passing axially through the spool valve piston and the actuator pistons.

The invention provides the advantages that instantaneous transition from positive to negative torque can be registered and also the amount or magnitude of the torque in each case. All electrical components normally associated with such measuring systems are dispensed with, since the cylinder pressures of the actuators may be read directly to assess the torque transmitted and the fluid pressure may be used as a signal for further control devices, particularly hydraulically operated control systems.

Figure 2:
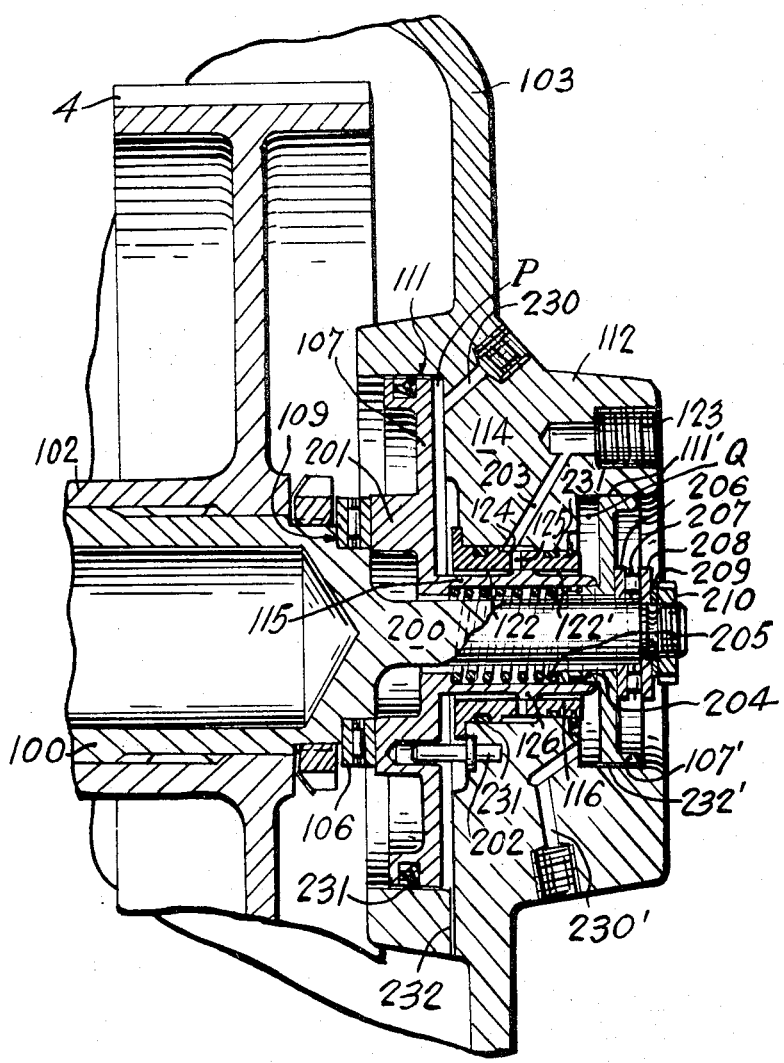

Having thus generally described the invention, the latter is hereafter more particularly described by reference to preferred embodiments illustrated in the accompanying drawings, in which:

FIGURE 1 is a cross-section along the shaft axis of torquemeter in accordance with the invention in the position of zero torque; and FIGURE 2 is a cross-section along the axis of a shaft of a second embodiment of torquemeter in accordance with the invention in the equilibrium position registering torque in one direction.

Referring to FIGURE 1, there is shown a shaft 1, mounted for axial displacement by roller bearings 2 which are mounted within a gear box casing 3. The shaft 1 is provided with helical gear teeth 4 in meshing engagement with the teeth of a second helical gear 5 coupled by means not shown to an aircraft propeller shaft. The helical gearing of parts 4 and 5 is arranged, as is well known, to provide an axial thrust upon the shaft 1 in one axial direction or the other, the thrust magnitude bearing a linear relationship with the torque transmitted between the gear 5 and the shaft 1.

At the right-hand end, the shaft 1 is mounted to a ball race 6, the outer end of which is mounted within a hollow cylindrical piston member 7. The ball race 6 abuts an axially facing shoulder 9 on the shaft 1 and an axially facing shoulder 10 on the piston member 7 for the transmission of axial thrust between the shaft 1 and the piston member 7. The piston member 7 is slidable axially within a hollow cylinder member 11, seated within a cylindrical recess in a housing 12 forming part of the gear box. The cylindrical member 11 is prevented by means such as bolts (not shown) extending into the housing 12, to prevent it rotating. Splines 13 on the piston member 7 extend within slots in the cylinder member 11 to allow axial displacement of the cylinder member 7 without allowing rotation thereof.

The housing 12 is provided with a complementary recess upon its other side, within which is disposed a second hollow cylinder member 11', which is also prevented by similar means from rotating. An axial bore 14 extends between the recesses in the housing 12.

The piston member 7 is integral with a spool valve piston 15 which is slidable axially within a spool valve cylinder member 16 disposed within the axial bore 14. Mounted upon the right-hand end of the spool valve piston 15 is a second hollow cylindrical piston member 7' having a piston face 17' facing towards the opposed piston face of the complementary hollow piston member 7. A retaining washer 18 prevents outward displacement of the piston member 7' with respect to the spool valve piston 15.

A pair of recesses are bored from either end into the spool valve piston member 15 leaving a central partition 19. The outer ends of the bores are enlarged and closed partially by retaining plugs 20 which are held in place by retaining washers 21, so as to leave a pair of chambers 22, 22' which act as transfer ports for the spool valve. An oil inlet 23 in the housing 12 communicates with a spool valve inlet port constituted by an annular recess 24 formed by complementary grooves in the housing member 12 and the outside surface of the central portion of the spool valve cylinder member 16, and a plurality of apertures 25 arranged around the periphery of the spool valve cylinder member 16. The piston member 15 is provided with a central land 26 in its outer surface and on either side of the central land, which is on a level with the partition 19, there are disposed a pair of peripheral annular recesses 27, 27' which communicate via circumferentially spaced apertures 28, 28' with respective chambers 22, 22'. At the outward ends of the chambers 22, 22', there are provided outlet ports constituted by circumferentially spaced apertures 29, 29'. The apertures 29 lead from chamber 22 into the space A within the hollow cylinder member 11 and in front of the piston face 17 which together constitute a first actuator. Correspondingly, the apertures 29' lead into the space B within the hollow cylinder member 11' and in front of the piston face 17' which constitute a second actuator. The oil pressure within the actuators is registered by signal lines 30 and 30' which communicate through the transverse walls of the cylinder members 11, 11' with the spaces A, B within the cylinders. The parts 31 denote oil seals.

The operation of the torquemeter of FIGURE 1 is as follows. When the torque between the gear 5 and the shaft 1 is in such a direction as to move the shaft 1 axially towards the right as shown in FIGURE 1, the spool valve piston member 15 which is rigid with the shaft 1 is urged to the right until the inlet port defined by apertures 28 is in register with the cylinder inlet port defined by apertures 25. Oil then flows from the inlet 23 into the transfer chamber 22 and through the apertures 29 in the extreme left-hand end of chamber 22 into the space A. The fluid pressure builds up against the piston face 17 until the shaft is moved leftward to an equilibrium position in which the spool valve is just closed with the central land 26 covering most of the spool valve cylinder inlet port. The pressure in the space A in the equilibrium position is a direct measurement of the thrust, and the fact that the thrust is in the right-hand direction is indicated by the fact that the pressure is derived from signal line 30 and not signal line 30'. When the thrust is removed, the oil pressure urges the shaft leftward again back towards the central neutral position. When the torque is in the opposite sense, the shaft 1 is urged to the left, and the piston member 15 of the spool valve is correspondingly urged to the left until the piston inlet port 27' is in register with the apertures 25 of the cylinder inlet port. Oil then flows into the chamber 22' and into the space B of the right-hand actuator. The piston face 17' is then moved towards the right to a fresh equilibrium position in which the land 26 just covers the cylinder inlet port. In this equilibrium position, the pressure in space B is a direct measurement of the torque imposed and the sense of the torque is indicated by the fact that the pressure is measured through signal line 30. The equilibrium pressure is maintained in cylinders A and B by a small flow of fluid through the bleed holes 35.

FIGURE 2 illustrates a preferred modification of the torquemeter, which reduces the number of oil seals necessary. In this embodiment a shaft 100 is rigid with a gear wheel 102, and is mounted by means not shown in a gear box housing 103. The gear wheel 102 is provided with helical gear teeth 4 which mesh with a second helical gear not shown to provide axial thrust upon the shaft 100 as a result of the torque imparted between the gears in the manner previously described in FIGURE 1.

The gear box provides a housing 112 in substantially the same manner as in FIGURE 1, and this is formed with a central bore 114 and recesses or bore enlargements which in this embodiment constitute themselves the walls of the actuator cylinders. The recesses are denoted 111 and 111' respectively.

In this embodiment the shaft 100 is formed at the right-hand end with a projecting portion 200 which extends through the bore 114. At the root of the projection the shaft 100 is formed with an annular shoulder 109 which abuts a cooperating shoulder 201 of a first piston member 107 which is slidable within the cylinder recess 111. Abutment between the shoulders 109 and 201 is made through a roller race 106 so that rotational movement of the shaft is not transmitted to the piston member. The piston member 107 is prevented from rotating by a spigot 202 seated within a bore in the housing 111 and also in a corresponding bore in the shoulder 201.

The piston member 107 constitutes an annular flange at one end of an integral with a first spool valve piston member 115 which is slidable within a spool valve cylinder member 116, which forms a bearing surface within the bore 114. Sliding contact between the piston member 115 and cylinder member 116 is made by a central land 126 on the piston member 115, which leaves annular spaces on each of its axial sides between the piston member 115 and cylinder member 116 and which constitute transition ports 122 and 122'. The transition port 122 communicates at its left-hand end directly past the end of cylinder member 115 with the actuator cylinder space P. The transition port 122' communicates directly at its right-hand end past the cylinder member 115 with the cylinder space Q of the right-hand actuator.

Pressurized oil is admitted to the spool valve through the inlet 123 which is on the outside of the gear box and suitably threaded to take an oil conduit. The oil passes through a bore 203 to an annular recess 124 between the cylinder member 116 and the bore 114, from which circumferentially arranged apertures 125 extend through the wall of the cylinder member 116 to constitute with the annular space 124 the cylinder inlet port.

The piston of the right-hand actuator is formed by piston member 107' which is formed with an axial projection or stub 204 which is bored to slide upon the projection 200 and which slides within an annular recess formed in the radially inner surface of the piston member 115 and which lies between the piston member 115 and the projection 200. A compression spring 205 is disposed in this annular space around the projection 200 to force the piston members 107 and 107' apart outwardly. The piston member 107' is prevented sliding off the projection 200 by washers 206, 207, 208, 209 and a lock nut 210 which is threaded on the end of the projection 200.

Fluid pressure signal bores 230 and 230' communicate with the cylinder spaces P and Q respectively and have threaded enlargements at the external face of the gear box to take signal lines. The parts 231 indicate oil seals. It will be apparent that a considerably reduced number of oil seals are necessary in the embodiment of FIGURE 2. Passages 232, 232' are provided to allow a bleed of oil when the cylinders P and Q are under pressure.

The operation of the embodiment of FIGURE 2 is generally similar to that of FIGURE 1. When the torque is in such a direction as to force the shaft 100 towards the right, the land 126, which in the neutral position closes the cylinder inlet port, is moved to the right allowing pressurized oil to pass through the inlet port apertures 125 into the transfer port 122 and thereafter into the space P into contact against the right-hand face of piston member 107. The piston member 107 is then forced to the left until an equilibrium position is assumed which position is indicated in FIGURE 2 and in which the land 126 just closes the inlet port apertures 125. The oil pressure signalled by line 230 is a direct measurement of the thrust and the direction of thrust is indicated by the fact that the signal comes from line 230, not line 230'.

When the thrust is in the opposite direction, the shaft 100 is moved to the left allowing oil to pass through the cylinder inlet port into the space 122' and into communication with the space Q into contact with the left-hand face of piston member 107' which is consequently forced towards the right. A second equilibrium position is then assumed when the pressure balances the thrust imposed and in which the land 126 just covers the inlet port apertures 125. The fluid pressure signalled by line 230 in this equilibrium position is then a direct measurement of the torque imposed and the sense of the torque is indicated by the fact that the torque is signalled from line 230' and not line 230.

The piston area of the piston member 107' is substantially smaller than that of the piston member 107. Thus, in this embodiment, it is anticipated that the left-hand actuator constituted by cylinder 111 and piston member 107 will be used to measure forward thrust which is substantially larger than the reverse thrust measured by the right-hand cylinder constituted by cylinder 111' and piston member 107'.

It will be apparent that many modifications of the apparatus shown in FIGURES 1 and 2 may be made by those skilled in the art. For example, although the arrangement of the actuator means back to back and concentric with the shaft provides a particularly useful compact arrangement, the actuator means need not necessarily be so deployed. Separate actuator cylinders may, if desired, be used side by side and even facing in the same direction, suitable levers being arranged as will be apparent to those skilled in the art for directing the actuator thrusts in the appropriate direction. It is necessary, however, that the shaft along which axial thrust is transmitted is connected with or integral with the piston of a double-acting spool valve, the valve being arranged to transmit fluid to the appropriate actuator for providing return thrust against the shaft 100 to balance the torque.

I claim:

1. A torquemeter for measuring positive and negative torque comprising:
    a rigid housing defining a pair of opposed open-ended cylinders and a spool valve cylinder disposed between said open-ended cylinders and having a central fluid inlet port,
    means constituting a fluid outlet port axially spaced on each side of said inlet port and communicating respectively with said open-ended cylinders,
    valve means slidable in said spool valve cylinder and defining a pair of transfer ports separated by a central land, said land beting of sufficient axial dimension to block said inlet port in a central position of said valve means indicative of "no thrust,"
    one of said transfer ports being adapted to register with said inlet port and with one of said outlet port means upon displacement of the valve means in one axial direction and the other transfer port being adapted to register with said inlet port and with the other of said outlet port means upon displacement of said valve means in the opposite axial direction,
    a shaft axially aligned with said valve means and displaceable axially, a helical gear on said shaft adapted to mesh with a driven helical gear for axial displacement of said shaft in proportion to torque transmitted through said gears, first piston means in one of said open-ended cylinders, second piston means in said other open-ended cylinder, said shaft being arranged to displace said first piston and said valve means in said one direction upon corresponding displacement by said gears and to displace said second piston and said valve means in said opposite direction upon corresponding displacement by said gears, said valve means being arranged to pass pressurized fluid into said first or said second open-ended cylinder depending upon the direction of displacement until said torque thrust is balanced by said fluid pressure, and fluid passages communicating with said cylinders, said fluid passages acting as signal lines to transmit an indication of the pressure acting on the piston means.

2. A torquemeter as claimed in claim 1 wherein said open-ended cylinders are coaxial with said spool valve cylinder, the latter extending centrally between the closed ends of the open end cylinders.

3. A torquemeter as claimed in claim 2 wherein said first and second pistons are formed as annular flanges rigid with said valve means adjacent respective axial extremities thereof.

4. A torquemeter as claimed in claim 3 wherein said valve means comprises a hollow cylinder closed at both ends and at said central land so as to define a pair of axially spaced transfer chambers, said transfer ports each including two axially spaced rows of circumferentially spaced apertures communicating with said chambers, the outermost rows lying adjacent and centrally of the pistons, and wherein said outlet port means are each constituted by an annular space between the axial extremities of said spool valve cylinder and the respective first and second pistons, said inlet port including an annular channel in the inner surface of said spool valve cylinder.

5. A torquemeter as claimed in claim 2 wherein said valve means comprises a cylindrical member having a pair of annular recessed portions constituting said transfer ports, separated by a central raised annular flange constituting said land, said inlet port being of generally annular configuration.

6. A torquemeter as claimed in claim 5 wherein said outlet port means are each constituted by an annular space between the axial extremities of said spool valve cylinder and the respective first and second pistons.

7. A torquemeter as claimed in claim 6 wherein said cylindrical member is axially bored, said shaft having a projection of reduced cross-section extending through said bore and constituting a bearing surface for said cylindrical member, and an axially directed shoulder forming a thrust surface at the root of said projection.

8. A torquemeter as claimed in claim 7 wherein said first piston forms a rigid flange substantially at one end of said cylindrical member and having an abutment surface directed to receive axial thrust from said shaft shoulder, a thrust bearing being located between said flange and said shoulder.

9. A torquemeter as claimed in claim 8 wherein said second piston comprises an annular piston portion and an axially enlarged, central stub portion bored and journally mounted on said shaft projection, said stub portion being slidable axially within a recess in said cylindrical valve member, the torquemeter including spring means arranged to urge said first and second pistons apart and a thrust bearing at the end of said shaft projection limiting outward movement of the second piston under the pressure of said spring means.

10. A torquemeter as claimed in claim 9 wherein said spring means comprises a compression spring surrounding said shaft projection within said recess for said stub portion, the latter recess being an annular recess located on the inner surface of said cylindrical member.

11. A torquemeter as claimed in claim 10 comprising means for preventing said first piston from rotating with said shaft.

References Cited

UNITED STATES PATENTS

| | | | |
|---|---|---|---|
| 1,272,041 | 7/1918 | Herr | 73—140 XR |
| 3,234,786 | 2/1966 | Christenson et al. | 73—136 |

FOREIGN PATENTS 912,145   12/1962   Great Britain.

RICHARD C. QUEISSER, Primary Examiner.

C. A. RUEHL, Examiner.